(12) United States Patent
Polavaram

(10) Patent No.: US 11,741,298 B1
(45) Date of Patent: Aug. 29, 2023

(54) REAL-TIME MEETING NOTES WITHIN A COMMUNICATION PLATFORM

(71) Applicant: Zoom Video Communications, Inc., San Jose, CA (US)

(72) Inventor: Ravi Teja Polavaram, Bellevue, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/878,015

(22) Filed: Jul. 31, 2022

(51) Int. Cl.
| | |
|---|---|
| *G06F 40/166* | (2020.01) |
| *H04L 65/1089* | (2022.01) |
| *G06F 3/0481* | (2022.01) |
| *G06F 3/16* | (2006.01) |
| *G06T 11/60* | (2006.01) |

(52) U.S. Cl.
CPC .......... *G06F 40/166* (2020.01); *G06F 3/0481* (2013.01); *G06F 3/167* (2013.01); *G06T 11/60* (2013.01); *H04L 65/1089* (2013.01)

(58) Field of Classification Search
CPC ...... G06F 40/166; G06F 3/0481; G06F 3/167; G06T 11/60; H04L 65/1089
See application file for complete search history.

(56) References Cited

U.S. PATENT DOCUMENTS

| | | | | |
|---|---|---|---|---|
| 7,298,930 B1 * | 11/2007 | Erol | ........................ | G06V 20/40 |
| | | | | 707/999.001 |
| 7,440,895 B1 * | 10/2008 | Miller | ................... | G10L 15/063 |
| | | | | 704/270 |
| 11,095,468 B1 * | 8/2021 | Pandey | ................. | G06F 16/345 |
| 2006/0075347 A1 * | 4/2006 | Rehm | ..................... | G10L 15/26 |
| | | | | 704/E15.045 |

(Continued)

OTHER PUBLICATIONS

"3 Reasons to Use Random Forest Over a Neural Network—Comparing Machine Learning versus Deep Learning", https://towardsdatascience.com/3-reasons-to-use-random-forest-over-a-neural-network-comparing-machine-learning-versus-deep-f9d65a154d89, by James Montantes, published Feb. 4, 2020, 7 pages, downloaded Nov. 21, 2022.*

*Primary Examiner* — William L Bashore
*Assistant Examiner* — Gregory A Distefano
(74) *Attorney, Agent, or Firm* — Young Basile Hanlon & MacFarlane, P.C.

(57) ABSTRACT

Methods and systems provide for real-time meeting notes within a communication session. In one embodiment, the system connects to a communication session with a plurality of participants; receives, in real time during the communication session, updates to a transcript of a conversation between the participants produced during the communication session, the transcript including timestamps for a plurality of utterances associated with speaking participants; receives a request from one of the participants to generate a meeting note which includes a subset of utterances from the transcript; determines a starting timestamp and an ending timestamp for utterances representing the boundaries of the meeting note; generates, in real time during the communication session, a meeting note where the utterances for the starting timestamp and ending timestamp are the starting utterance and ending utterance of the meeting note, respectively; and presents to at least the participant, within a user interface, the generated meeting note.

19 Claims, 5 Drawing Sheets

(56) References Cited

U.S. PATENT DOCUMENTS

| | | | | |
|---|---|---|---|---|
| 2010/0169309 | A1* | 7/2010 | Barrett | G06F 16/951 |
| | | | | 707/E17.108 |
| 2020/0034711 | A1* | 1/2020 | Misra | G06N 20/00 |
| 2020/0321007 | A1* | 10/2020 | Stoker | G10L 15/26 |
| 2021/0021558 | A1* | 1/2021 | Mahmoud | H04L 51/046 |
| 2021/0375291 | A1* | 12/2021 | Zeng | G06F 16/535 |
| 2022/0076707 | A1* | 3/2022 | Walker | G11B 27/036 |

* cited by examiner

REAL-TIME MEETING NOTES WITHIN A COMMUNICATION PLATFORM

FIELD OF INVENTION

The present invention relates generally to digital communication, and more particularly, to systems and methods for providing real-time meeting notes within a communication session.

SUMMARY

The appended claims may serve as a summary of this application.

BRIEF DESCRIPTION OF THE DRAWINGS

The present invention relates generally to digital communication, and more particularly, to systems and methods for providing real-time meeting notes within a communication session.

The present disclosure will become better understood from the detailed description and the drawings, wherein.

DETAILED DESCRIPTION

Figure 1A:
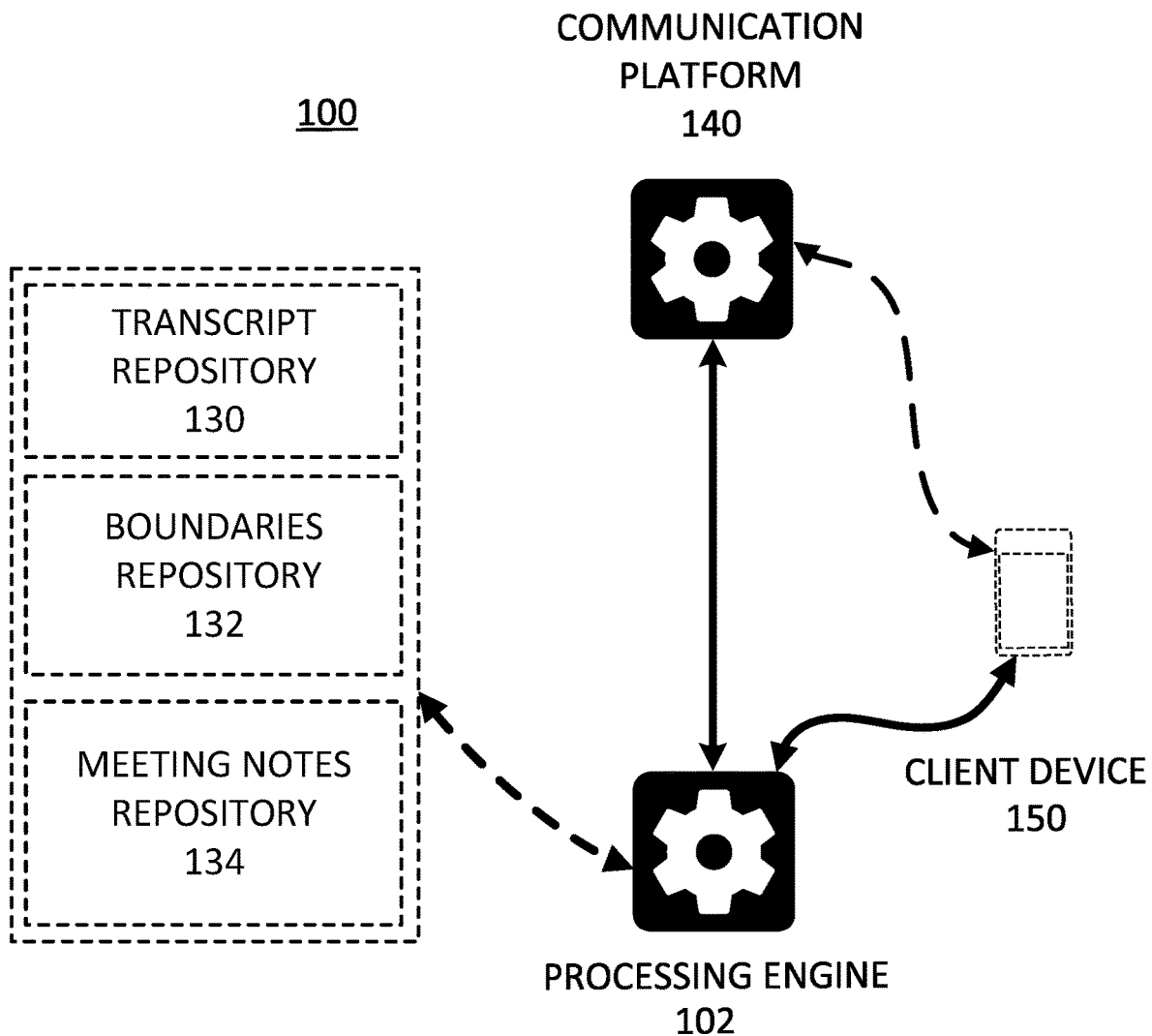
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video communication platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

Particularly, there is currently no way to "save a meeting note" during a meeting, such that a user may click a button which generates a meeting note in real time while the communication session is underway. An essential aspect of this ability to instantly generate a note is for the system to determine the boundaries of the note to generate, that is, where the starting point and ending point of the meeting note should be. Rather than having a prespecified time (in, e.g., seconds) before and after the user clicks the note and having the boundaries established based on that prespecified time, it would be advantageous to having the system determine the boundaries of the meeting note in an intelligent manner based on the context and content of the meeting.

Thus, there is a need in the field of digital communication tools and platforms to create a new and useful system and method for providing real-time meeting notes within a communication session. The source of the problem, as discovered by the inventors, is a lack of ability for the system to intelligently determine the boundaries of where in the meeting a meeting note should begin and where it should end.

In one embodiment, the system connects to a communication session with a plurality of participants; receives, in real time during the communication session, updates to a transcript of a conversation between the participants produced during the communication session, the transcript including timestamps for a plurality of utterances associated with speaking participants; receives a request from one of the participants to generate a meeting note which includes a subset of utterances from the transcript; determines a starting timestamp and an ending timestamp for utterances representing the boundaries of the meeting note; generates, in real time during the communication session, a meeting note where the utterances for the starting timestamp and ending timestamp are the starting utterance and ending utterance of the meeting note, respectively; and presents to at least the participant, within a user interface ("UI"), the generated meeting note.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., transcript repository 130, boundaries repository 132, and/or meeting notes repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
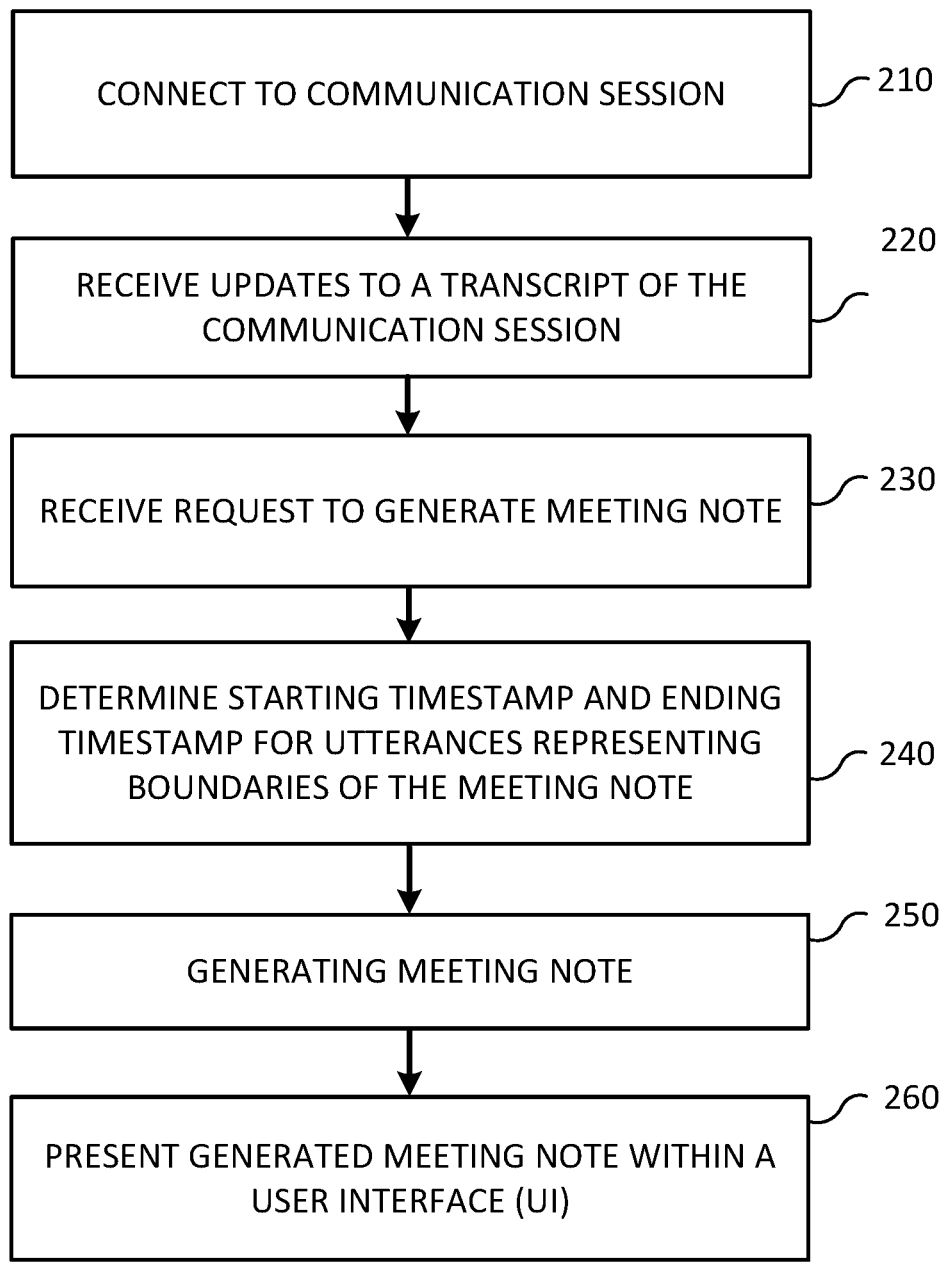
FIG. 2 is a flow chart illustrating an exemplary method that may be performed in some embodiments.

In an embodiment, the processing engine 102 may perform the exemplary method of FIG. 2 or other method herein and, as a result, provide real-time meeting notes within a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include a transcript repository 130, boundaries repository 132, and/or meeting notes repository 134. The optional repositories function to store and/or maintain, respectively, a transcript for the communication session; determined boundaries for meeting notes, including a starting timestamp and ending timestamp within the communication session; and generated meeting notes for the communication session. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
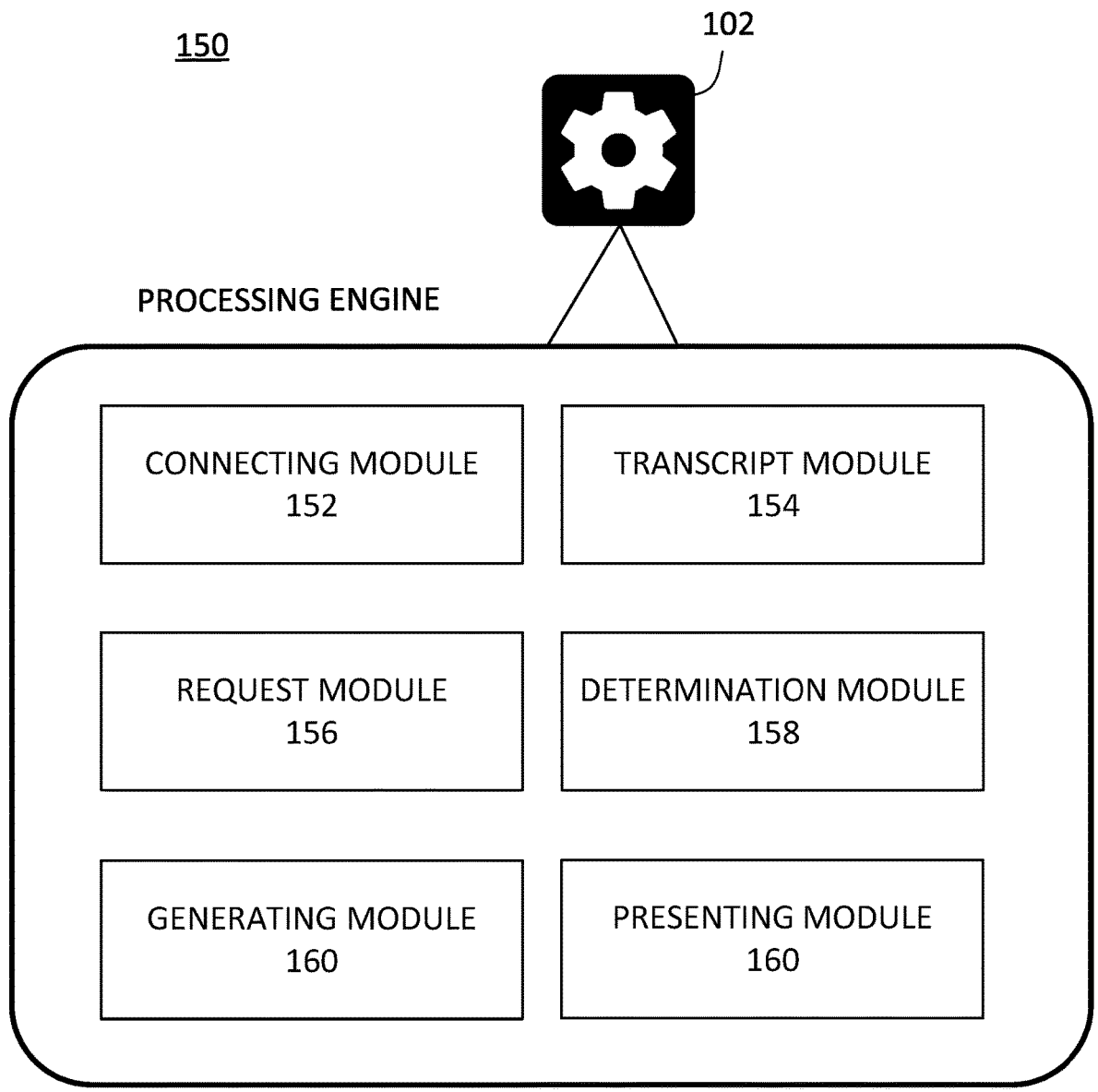
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connecting module 152 functions to connect to a communication session with a plurality of participants.

Transcript module 154 functions to receive, in real time during the communication session, updates to a transcript of a conversation between the participants produced during the communication session, the transcript including timestamps for a plurality of utterances associated with speaking participants.

Request module 156 functions to receive a request from one of the participants to generate a meeting note which includes a subset of utterances from the transcript.

Determination module 158 functions to determine a starting timestamp and an ending timestamp for utterances representing the boundaries of the meeting note.

Generating module 160 functions to generate, in real time during the communication session, a meeting note where the utterances for the starting timestamp and ending timestamp are the starting utterance and ending utterance of the meeting note, respectively.

Presenting module 162 functions to present to at least the participant, within a UI, the generated meeting note.

The above modules and their functions will be described in further detail in relation to an exemplary method below.

FIG. 2A is a flow chart illustrating an exemplary method that may be performed in some embodiments.

At step 210, the system connects to a communication session with a plurality of participants.

In some embodiments, the system connects a client device associated with a user of a communication platform to the communication session via the communication platform. In some embodiments, the system then presents a UI within the client device, the UI being associated with the particular communication session that the client device is currently connected to.

In some embodiments, the system presents a UI associated with a particular communication session that the client device is currently connected to. In other embodiments, the system presents a UI associated with a particular communication session that has been previously conducted and has been terminated or completed. With respect to a communication session, either being conducted currently or completed, the client device has connected to the session with one or more other participants to the communication session. The communication session may represent, for example, an instance of a video conference, webinar, informal chat session, or any other suitable session which has been initiated and hosted via the video communication platform for the purpose of remotely communicating with one or more users of the video communication platform, i.e., the participants within the communication session. Participants are connected to the session via user devices, and are associated with user accounts within the communication platform.

In some embodiments, the participants are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., send messages back and forth between) one another in real time.

In some embodiments, the UI may present one or more screens or windows relating to settings, preferences, or other configuration aspects of the communication session.

At step 220, the system receives, in real time during the communication session, updates to a transcript of a conversation between the participants produced during the communication session, the transcript including timestamps for a plurality of utterances associated with speaking participants.

The transcript the system receives relates to a conversation between the participants that is produced during the communication session. That is, the conversation which was produced during the communication is used to generate a transcript. In some embodiments, the transcript is generated in real-time while the communication session is underway and the conversation is in progress. In various embodiments, the transcript is either generated by the system, or is generated elsewhere and retrieved by the system for use in the present systems and methods. In some embodiments, the transcript is textual in nature. In some embodiments, the transcript includes a number of utterances, which are composed of one or more sentences attached to a specific speaker of that sentence (i.e., participant). Timestamps may be attached to each utterance and/or each sentence. In some embodiments, the transcript is generated in real-time while the communication session is underway, and is presented after the meeting has terminated. In other embodiments, the transcript is generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the transcript. In some embodiments, natural language processing ("NLP") techniques may be used in whole or in part to generate the transcript.

At step 230, the system receives a request from one of the participants to generate a meeting note which includes a subset of utterances from the transcript. In some embodiments, the request includes a timestamp when the participant requested the meeting note to be generated.

In some embodiments, this request is received while the communication session is underway. In some embodiments, this request to generate a meeting note is initiated by the participant interactively selecting a UI element for saving a note. For example, a button in the lower right corner of the UI shown to the participant may read "Save a Note". Upon the user selecting that button, the system receives a request from that participant to generate a meeting note during that time.

In some embodiments, the system may be configured to detect one or more automated note taking conditions. The system may then automatically initiate the request to generate the note on behalf of the participant upon the detecting of the automated note taking condition(s). In this way, notes can be automatically generated for participants without them needing to select a note taking UI element. In some embodiments, the specific automated note taking conditions can be selected, customized, or adjusted by the participant in a settings, preferences, or options UI. An example of an automated note taking condition can include, e.g., the system receiving an indication that one or more key words or phrases have been detected in the session content.

At step 240, the system determines a starting timestamp and an ending timestamp for utterances representing the boundaries of the meeting note. That is, given the timestamp when the user requests a meeting note to be generating, the system employs a model to predict the starting utterance and ending utterance corresponding to the boundaries of the meeting note that the user might be interested in. Those starting and ending utterances correspond to a starting timestamp and ending timestamp of the communication session, respectively. The timestamps of the communication session and their correspondence to utterances within the communication session are provided via the received transcript updates which are generated in real time.

In some embodiments, pre-processing steps are performed for the determination model, whereby short sentences are merged with nearby longer sentences. At least a subset of the models described herein make use of these merged sentences as the basic units for performing the determination. Use of the word "sentences" below may be understood to potentially mean "merged sentences" with respect to these pre-processing steps.

In some embodiments, the determining the starting timestamp and the ending timestamp for the meeting note is performed by an artificial intelligence (AI) model employing one or more supervised segmentation techniques. In some embodiments, the output of this module is a score corresponding to each sentence. For example, this score may be in the range [0,1]. This score represents the probability that a meeting note boundary occurs at that sentence. Each instance for this model is a single sentence.

In some embodiments, the AI model is trained to extract one or more content-based features, and generate a prediction of the starting timestamp and the ending timestamp based at least in part on the one or more content-based features.

In some embodiments, the AI model extracts the content-based features using a TextTiling training model. For a given sentence, a score is calculated based on the similarity between a window of sentences preceding and following the given sentence. In some embodiments, this score calculation consists of 2 steps. First, the system concatenates the sentences in the window and encodes using a transformer to get an embedding. Second, the system calculates the cosine similarity between the embeddings of preceding and following windows.

In some embodiments, using the sequence of scores obtained by the above step, the system selects the boundaries based on the score value, if this score is a peak value, and a metric measuring how well the peak is formed.

In some embodiments, the AI model extracts the content-based features using a language model via self-supervised pre-training. Such a language model may include, e.g., a BERT transformer for dialog topic segmentation. In such a model, positive and negative samples are conducted for pre-training. Positive samples are consecutive utterance pairs. Negative samples consist of randomly sampled utterance pairs from the same transcript, and also from different transcripts from previous communication sessions. In some embodiments, this sampling may be further improved by having access to the topic or category of the transcript, such as, e.g., "sports".

In some embodiments, the system extracts one or more conversational features via a rule-based model, and determines the starting timestamp and the ending timestamp based at least in part on the conversational features. The purpose of using conversational features is because they can provide an indication about paragraph or meeting note boundaries. In various embodiments, such a model can consist of one or more of the following features: pauses between the utterances; a change of speaker between consecutive utterances; cue phrases such as 'so', 'okay', 'anyway', or 'and' which may provide an indication of a new paragraph; or the rate of speech, e.g., the number of words spoken per second.

In some embodiments, the AI model is trained to: extract one or more multimodal features, and generate a prediction of the starting timestamp and the ending timestamp based at least in part on the one or more multimodal features. In various embodiments, such a model can consist of one or more of the following features: loudness, which is an audio feature; or the change of slides and other visual features.

In some embodiments, a pointwise score predictor may be employed as part of the supervised segmentation. The main goal is to predict the probability that a boundary is occurring at a given sentence. The pointwise score predictor uses one or more of the above-mentioned content-based features, conversational features, and/or multimodal features in order to predict the score for each sentence.

In some embodiments, the model uses logistic regression. In some embodiments, L2 regularization and balanced class weights are utilized. In some embodiments, the strength for L2 regularization is calculated using a grid search. Since the number of boundaries (i.e., positive samples) are lesser than non-boundary sentences (i.e., negative samples), class weights are balanced during training which has the effect of increasing the weight/loss for the smaller class.

In some embodiments, determining the starting timestamp and the ending timestamp for the meeting note includes employing a pairwise meeting note boundary. In some embodiments, the output of the above-mentioned supervised segmentation is a score for each sentence. In this step, the system generates scores for pairs of sentences. Each pair represents a potential meeting note boundary of the form (start_sentence_id, end_sentence_id).

In some embodiments, the system generates a list of candidates via a rule-based model, each candidate including a boundary pair of a starting utterance and an ending utterance representing a boundary for the meeting note. In some embodiments, this rule-based model has a high recall so that no potential candidates are missed for consideration by a later ranking model. In some embodiments, this model only filters out pairs which have a low probability of being a good meeting note. In some embodiments, the model is a rule-based generator which generates all the pairs such that: 1) It contains the timestamp of a user input obtained from a user providing an adjustment of starting and/or ending timestamps, as described above, and 2) the scores for both the starting and ending sentences obtained from the pointwise score predictor are above a threshold.

In some embodiments, determining the starting timestamp and the ending timestamp for the meeting note further includes employing the pairwise meeting note boundary to generate rankings for the boundary pairs via a random forest regressor. In some embodiments, this module ranks the candidates generated above, and picks the highest ranked candidate as the resultant meeting note.

In various embodiments, the features considered for each boundary pair are: the scores for the starting and ending boundaries obtained from the pointwise score predictor; the length of the meeting note; and binary features representing if the scores are local maxima (peaks).

At step 250, the system generates, in real time during the communication session, a meeting note where the utterances for the starting timestamp and ending timestamp are the starting utterance and ending utterance of the meeting note, respectively.

The system generates this note in response to the system receiving the request to generate the note during step 230. In some embodiments, the generated note is associated specifically with the requesting participant who requested the note to be generated, and remains connected to that participant's account or user profile within the communication platform for future playback and access.

In some embodiments, the note the system generates includes a subset of the generated transcript for the session content that corresponds to the determined boundaries of the meeting note, i.e., the utterances of the transcript which begin at the starting timestamp and end at the ending timestamp.

At step 260, the system presents to at least the participant, within a UI, the generated meeting note.

In some embodiments, the system provides access to the requesting participant to the meeting note upon demand, such as upon the user interactively selecting a button to view the meeting note or to view all meeting notes generated during the session. In some embodiments, this access is provided in real-time while the current communication session is still in progress, so a participant can access and review note material during the communication session if needed. In other embodiments, access is provided only after the communication session has completed or otherwise terminated. In some embodiments, access is provided both during the communication session, and after the communication session has completed.

In some embodiments, where the meeting note is presented in real time during the communication session, the presented meeting note is editable by the participant in real time during the communication session. In some embodiments, the meeting note is editable by allowing the participant to adjust the boundaries of the meeting note, i.e., adjusting the starting timestamp and/or ending timestamp to a different starting timestamp and/or ending timestamp.

In some embodiments, the system receives a request from the participant to edit the boundaries of the meeting note, such that one or more of the starting and ending timestamp may be adjusted to a different timestamp. The system then determines, based on the request, one or more of a new starting timestamp and a new ending timestamp.

In some embodiments, the new starting timestamp and new ending timestamp are ingested as training data for training a model to determine starting timestamps and ending timestamps for one or more future meeting notes. Thus, the user input for adjustment of meeting note timestamps can be utilized for improvement of the functioning of the model for determining the starting timestamp and ending timestamp for the meeting note.

In some embodiments, where the meeting note is presented only after the communication session has terminated, the note is presented within an after-meeting UI. The after-meeting UI may be any UI which is presented after the meeting has concluded, where the UI presents the meeting note, and optionally other elements which may be useful to review after the meeting has concluded. In some embodiments, the generated meeting note is presented within the after-meeting UI concurrently with one or more additional meeting notes generated during the communication session. Thus, potentially all of the meeting notes the user requested generation of can be viewed after the meeting is over.

In some embodiments, presenting the generated meeting note comprises presenting at least a subset of the transcript such that the utterances within the boundaries of the meeting note are highlighted within the transcript. In some embodiments, the highlighted boundaries of the meeting notes are modifiable by the participant to adjust one or more of the starting timestamp and ending timestamp to a different timestamp.

Figure 3:
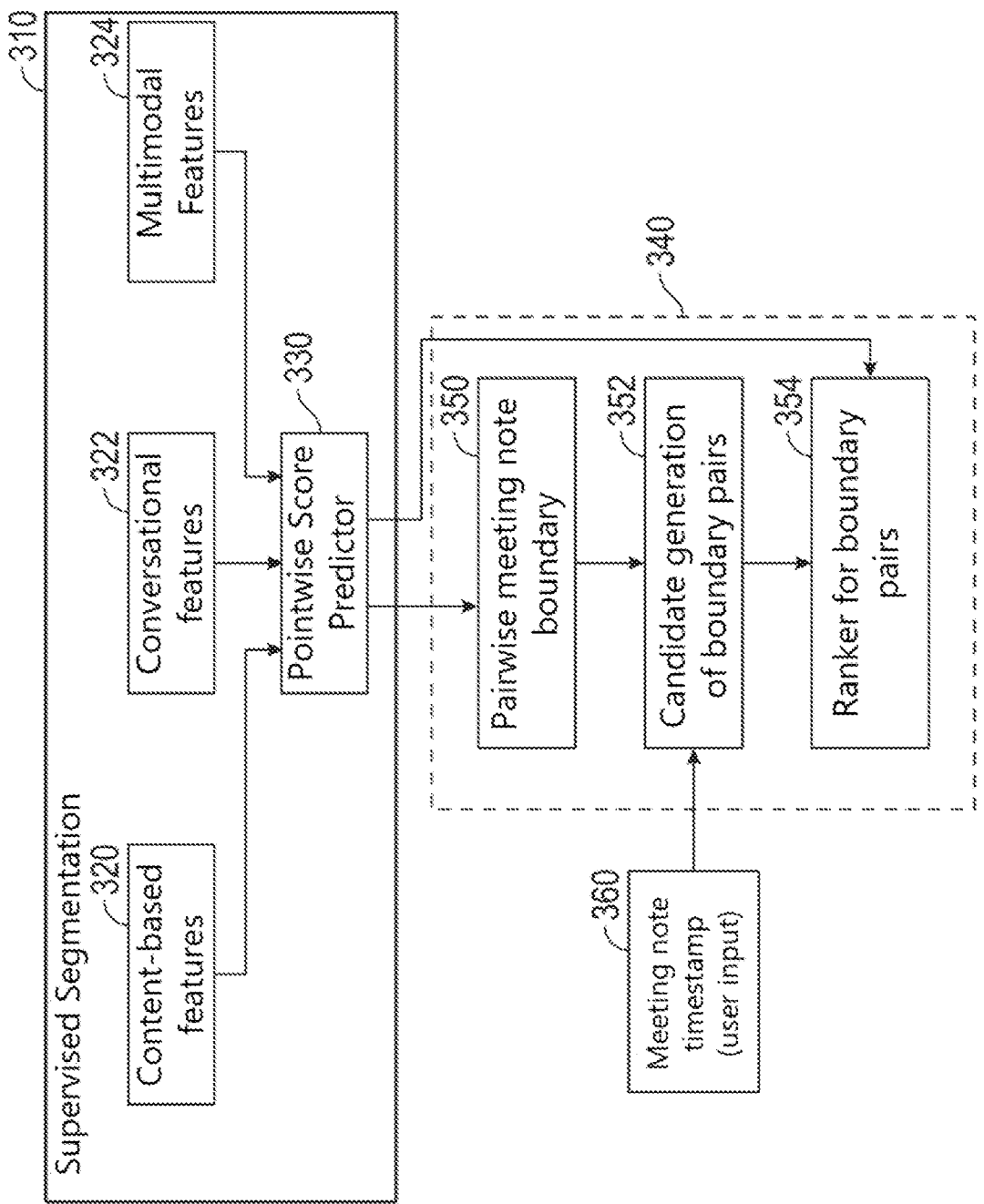
FIG. 3 is a flow chart illustrating an exemplary method that may be performed in some embodiments.

FIG. 3 is a flow chart illustrating an exemplary method that may be performed in some embodiments.

Within the illustration, supervised segmentation 310 is first performed. One or more of content-based features 320, conversational features 322, and multimodal features 324 are extracted. At least a subset of these features are employed in the pointwise score predictor 330. In a second module, a pairwise meeting note boundary 350 is employed. Candidate generation of boundary pairs 352 is performed, which may use as an input one or more adjusted meeting note timestamps as user input 360. Finally, a ranker for the boundary pairs 354 is employed. These various steps and models which may be employed for determination of the starting and ending timestamps for the meeting note are described in detail above with respect to FIG. 2, step 240.

Figure 4:
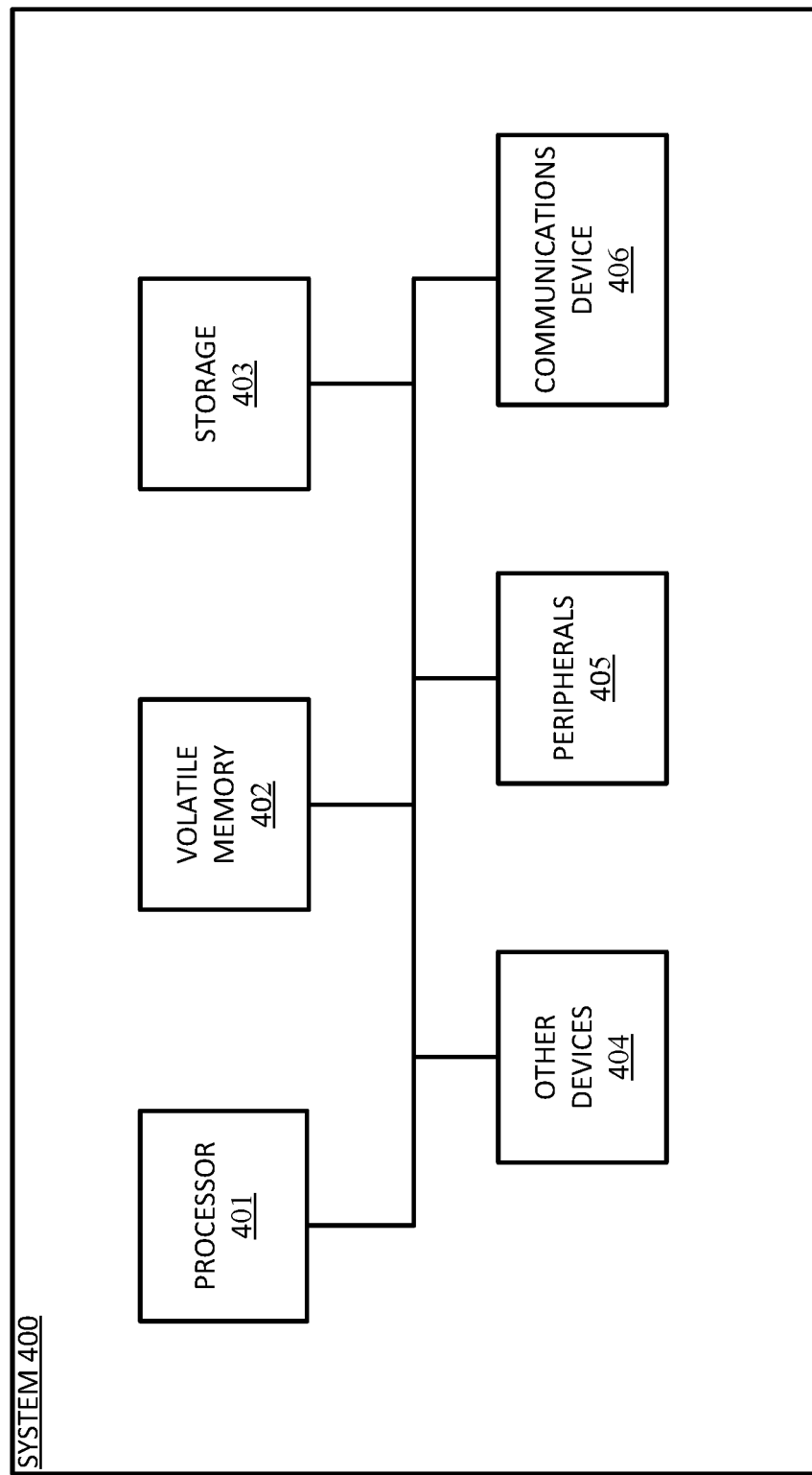
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

It will be appreciated that the present disclosure may include any one and up to all of the following examples.

Example 1. A method, comprising: connecting to a communication session with a plurality of participants; receiving, in real time during the communication session, updates to a transcript of a conversation between the participants produced during the communication session, the transcript comprising timestamps for a plurality of utterances associated with speaking participants; receiving a request from one of the participants to generate a meeting note comprising a subset of utterances from the transcript; determining a starting timestamp and an ending timestamp for utterances representing the boundaries of the meeting note; generating, in real time during the communication session, a meeting note where the utterances for the starting timestamp and ending timestamp are the starting utterance and ending utterance of the meeting note, respectively; and presenting to at least the participant, within a user interface (UI), the generated meeting note.

Example 2. The method of example 1, wherein presenting the generated meeting note to at least the participant within the UI occurs in real time during the communication session.

Example 3. The method of example 2, wherein the presented meeting note is editable by the participant in real time during the communication session.

Example 4. The method of any of examples 1-3, wherein the generated meeting note is presented after the communication session has terminated within an after-meeting UI.

Example 5. The method of example 4, wherein the generated meeting note is presented within the after-meeting UI concurrently with one or more additional meeting notes generated during the communication session.

Example 6. The method of any of examples 1-5, wherein presenting the generated meeting note comprises presenting at least a subset of the transcript such that the utterances within the boundaries of the meeting note are highlighted within the transcript.

Example 7. The method of example 6, wherein the highlighted boundaries of the meeting notes are modifiable by the participant to adjust one or more of the starting timestamp and ending timestamp to a different timestamp.

Example 8. The method of any of examples 1-7, further comprising: receiving a request from the participant to edit the boundaries of the meeting note, such that one or more of the starting and ending timestamp may be adjusted to a different timestamp; and determining, based on the request, one or more of a new starting timestamp and a new ending timestamp.

Example 9. The method of example 9, wherein the new starting timestamp and new ending timestamp are ingested as training data for training a model to determine starting timestamps and ending timestamps for one or more future meeting notes.

Example 10. The method of any of examples 1-9, wherein determining the starting timestamp and the ending timestamp for the meeting note is performed by an artificial intelligence (AI) model employing one or more supervised segmentation techniques.

Example 11. The method of example 10, wherein the AI model is trained to: extract one or more content-based features; and generate a prediction of the starting timestamp and the ending timestamp based at least in part on the one or more content-based features.

Example 12. The method of example 11, wherein the AI model extracts the content-based features using one or more of: a TextTiling training model, and a language model via self-supervised pre-training.

Example 13. The method of example 11, wherein the AI model is trained to: extract one or more multimodal features; and generate a prediction of the starting timestamp and the ending timestamp based at least in part on the one or more multimodal features.

Example 14. The method of any of examples 1-13, wherein determining the starting timestamp and the ending timestamp for the meeting note comprises: extracting one or more conversational features via a rule-based model; and determining the starting timestamp and the ending timestamp based at least in part on the conversational features.

Example 15. The method of any of examples 1-14, wherein determining the starting timestamp and the ending timestamp for the meeting note comprises employing a pairwise meeting note boundary to generate a list of candidates via a rule-based model, each candidate comprising a boundary pair of a starting utterance and an ending utterance representing a boundary for the meeting note.

Example 16. The method of example 15, wherein determining the starting timestamp and the ending timestamp for the meeting note further comprises employing the pairwise meeting note boundary to generate rankings for the boundary pairs via a random forest regressor.

Example 17. The method of any of examples 1-16, wherein the request from one of the participants to generate a meeting note is initiated by the participant by interactively selecting a UI element for saving a note.

Example 18. The method of any of examples 1-17, wherein the one or more processors are further configured to perform the operations of: detecting one or more automated note taking conditions, wherein the request from one of the participants to generate a meeting note is automatically initiated based on the detecting of the one or more automated note taking conditions.

Example 19. A communication system comprising one or more processors configured to perform the operations of: connecting to a communication session with a plurality of participants; receiving, in real time during the communication session, updates to a transcript of a conversation between the participants produced during the communication session, the transcript comprising timestamps for a plurality of utterances associated with speaking participants; receiving a request from one of the participants to generate a meeting note comprising a subset of utterances from the transcript; determining a starting timestamp and an ending timestamp for utterances representing the boundaries of the meeting note; generating, in real time during the communication session, a meeting note where the utterances for the starting timestamp and ending timestamp are the starting utterance and ending utterance of the meeting note, respectively; and presenting to at least the participant, within a user interface (UI), the generated meeting note.

Example 20. The communication system of example 19, wherein presenting the generated meeting note to at least the participant within the UI occurs in real time during the communication session.

Example 21. The communication system of example 20, wherein the presented meeting note is editable by the participant in real time during the communication session.

Example 22. The communication system of any of examples 19-21, wherein the generated meeting note is presented after the communication session has terminated within an after-meeting UI.

Example 23. The communication system of example 22, wherein the generated meeting note is presented within the after-meeting UI concurrently with one or more additional meeting notes generated during the communication session.

Example 24. The communication system of any of examples 19-23, wherein presenting the generated meeting note comprises presenting at least a subset of the transcript such that the utterances within the boundaries of the meeting note are highlighted within the transcript.

Example 25. The communication system of example 24, wherein the highlighted boundaries of the meeting notes are modifiable by the participant to adjust one or more of the starting timestamp and ending timestamp to a different timestamp.

Example 26. The communication system of any of examples 19-25, further comprising: receiving a request from the participant to edit the boundaries of the meeting note, such that one or more of the starting and ending timestamp may be adjusted to a different timestamp; and determining, based on the request, one or more of a new starting timestamp and a new ending timestamp.

Example 27. The communication system of example 26, wherein the new starting timestamp and new ending timestamp are ingested as training data for training a model to determine starting timestamps and ending timestamps for one or more future meeting notes.

Example 28. The communication system of any of examples 19-27, wherein determining the starting timestamp and the ending timestamp for the meeting note is performed by an artificial intelligence (AI) model employing one or more supervised segmentation techniques.

Example 29. The communication system of example 28, wherein the AI model is trained to: extract one or more content-based features; and generate a prediction of the starting timestamp and the ending timestamp based at least in part on the one or more content-based features.

Example 30. The communication system of example 29, wherein the AI model extracts the content-based features using one or more of: a TextTiling training model, and a language model via self-supervised pre-training.

Example 31. The communication system of example 28, wherein the AI model is trained to: extract one or more multimodal features; and generate a prediction of the starting timestamp and the ending timestamp based at least in part on the one or more multimodal features.

Example 32. The communication system of any of examples 19-31, wherein determining the starting timestamp and the ending timestamp for the meeting note comprises: extracting one or more conversational features via a rule-based model; and determining the starting timestamp and the ending timestamp based at least in part on the conversational features.

Example 33. The communication system of any of examples 19-32, wherein determining the starting timestamp and the ending timestamp for the meeting note comprises employing a pairwise meeting note boundary to generate a list of candidates via a rule-based model, each candidate comprising a boundary pair of a starting utterance and an ending utterance representing a boundary for the meeting note.

Example 34. The communication system of example 33, wherein determining the starting timestamp and the ending timestamp for the meeting note further comprises employing the pairwise meeting note boundary to generate rankings for the boundary pairs via a random forest regressor.

Example 35. The communication system of any of examples 19-34, wherein the request from one of the participants to generate a meeting note is initiated by the participant by interactively selecting a UI element for saving a note.

Example 36. The communication system of any of examples 19-35, wherein the one or more processors are further configured to perform the operations of: detecting one or more automated note taking conditions, wherein the request from one of the participants to generate a meeting note is automatically initiated based on the detecting of the one or more automated note taking conditions.

Example 37. A non-transitory computer-readable medium containing instructions comprising: instructions for connecting to a communication session with a plurality of participants; instructions for receiving, in real time during the communication session, updates to a transcript of a conversation between the participants produced during the communication session, the transcript comprising timestamps for a plurality of utterances associated with speaking participants; instructions for receiving a request from one of the participants to generate a meeting note comprising a subset of utterances from the transcript; instructions for determining a starting timestamp and an ending timestamp for utterances representing the boundaries of the meeting note; instructions for generating, in real time during the communication session, a meeting note where the utterances for the starting timestamp and ending timestamp are the starting utterance and ending utterance of the meeting note, respectively; and instructions for presenting to at least the participant, within a user interface (UI), the generated meeting note.

Example 38. The non-transitory computer-readable medium of example 37, wherein presenting the generated meeting note to at least the participant within the UI occurs in real time during the communication session.

Example 39. The non-transitory computer-readable medium of example 38, wherein the presented meeting note is editable by the participant in real time during the communication session.

Example 40. The non-transitory computer-readable medium of any of examples 37-39, wherein the generated meeting note is presented after the communication session has terminated within an after-meeting UI.

Example 41. The non-transitory computer-readable medium of example 40, wherein the generated meeting note is presented within the after-meeting UI concurrently with one or more additional meeting notes generated during the communication session.

Example 42. The non-transitory computer-readable medium of any of examples 37-41, wherein presenting the generated meeting note comprises presenting at least a subset of the transcript such that the utterances within the boundaries of the meeting note are highlighted within the transcript.

Example 43. The non-transitory computer-readable medium of example 42, wherein the highlighted boundaries of the meeting notes are modifiable by the participant to adjust one or more of the starting timestamp and ending timestamp to a different timestamp.

Example 44. The non-transitory computer-readable medium of any of examples 37-43, further comprising: receiving a request from the participant to edit the boundaries of the meeting note, such that one or more of the starting and ending timestamp may be adjusted to a different timestamp; and determining, based on the request, one or more of a new starting timestamp and a new ending timestamp.

Example 45. The non-transitory computer-readable medium of example 44, wherein the new starting timestamp and new ending timestamp are ingested as training data for training a model to determine starting timestamps and ending timestamps for one or more future meeting notes.

Example 46. The non-transitory computer-readable medium of any of examples 37-45, wherein determining the starting timestamp and the ending timestamp for the meeting note is performed by an artificial intelligence (AI) model employing one or more supervised segmentation techniques.

Example 47. The non-transitory computer-readable medium of example 46, wherein the AI model is trained to: extract one or more content-based features; and generate a prediction of the starting timestamp and the ending timestamp based at least in part on the one or more content-based features.

Example 48. The non-transitory computer-readable medium of example 47, wherein the AI model extracts the content-based features using one or more of: a TextTiling training model, and a language model via self-supervised pre-training.

Example 49. The non-transitory computer-readable medium of example 40, wherein the AI model is trained to: extract one or more multimodal features; and generate a prediction of the starting timestamp and the ending timestamp based at least in part on the one or more multimodal features.

Example 50. The non-transitory computer-readable medium of any of examples 37-49, wherein determining the starting timestamp and the ending timestamp for the meeting note comprises: extracting one or more conversational features via a rule-based model; and determining the starting timestamp and the ending timestamp based at least in part on the conversational features.

Example 51. The non-transitory computer-readable medium of any of examples 37-50, wherein determining the starting timestamp and the ending timestamp for the meeting note comprises employing a pairwise meeting note boundary to generate a list of candidates via a rule-based model, each candidate comprising a boundary pair of a starting utterance and an ending utterance representing a boundary for the meeting note.

Example 52. The non-transitory computer-readable medium of example 51, wherein determining the starting timestamp and the ending timestamp for the meeting note further comprises employing the pairwise meeting note boundary to generate rankings for the boundary pairs via a random forest regressor.

Example 53. The non-transitory computer-readable medium of any of examples 37-52, wherein the request from one of the participants to generate a meeting note is initiated by the participant by interactively selecting a UI element for saving a note.

Example 54. The non-transitory computer-readable medium of any of examples 37-53, wherein the one or more processors are further configured to perform the operations of: detecting one or more automated note taking conditions, wherein the request from one of the participants to generate a meeting note is automatically initiated based on the detecting of the one or more automated note taking conditions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    connecting to a communication session with a plurality of participants;
    receiving, in real time during the communication session, updates to a transcript of a conversation between the participants produced during the communication session, the transcript comprising timestamps for a plurality of utterances associated with speaking participants;
    receiving a request from one of the participants to generate a meeting note;
    determining, based on the request and the transcript of the conversation, a starting timestamp and an ending timestamp for utterances representing the boundaries of the meeting note, the determining being performed by an artificial intelligence (AI) model employing one or more supervised segmentation techniques and trained via self-supervised pre-training, the determining comprising:
        calculating a sequence of scores based on the content-based similarity between a window of sentences in the transcript that precede and follow sentences in the transcript; and
        generating predictions of the starting timestamp and the ending timestamp using the plurality of scores in sequential order;
    generating, in real time during the communication session, a meeting note where the utterances for the starting timestamp and ending timestamp are the starting utterance and ending utterance of the meeting note, respectively; and
    presenting to at least the participant, within a user interface (UI), the generated meeting note.

2. The method of claim 1, wherein presenting the generated meeting note to at least the participant within the UI occurs in real time during the communication session.

3. The method of claim 2, wherein the presented meeting note is editable by the participant in real time during the communication session.

4. The method of claim 1, wherein the generated meeting note is presented after the communication session has terminated within an after-meeting UI.

5. The method of claim 4, wherein the generated meeting note is presented within the after-meeting UI concurrently with one or more additional meeting notes generated during the communication session.

6. The method of claim 1, wherein presenting the generated meeting note comprises presenting at least a subset of the transcript such that the utterances within the boundaries of the meeting note are highlighted within the transcript.

7. The method of claim 6, wherein the highlighted boundaries of the meeting notes are modifiable by the participant to adjust one or more of the starting timestamp and ending timestamp to a different timestamp.

8. The method of claim 1, further comprising: receiving a request from the participant to edit the boundaries of the meeting note, such that one or more of the starting and ending timestamp may be adjusted to a different timestamp; and determining, based on the request, one or more of a new starting timestamp and a new ending timestamp.

9. The method of claim 8, wherein the new starting timestamp and new ending timestamp are ingested as training data for training a model to determine starting timestamps and ending timestamps for one or more future meeting notes.

10. The method of claim 1, wherein the AI model is trained to: extract one or more content-based features; and generate a prediction of the starting timestamp and the ending timestamp based at least in part on the one or more content-based features.

11. The method of claim 10, wherein the AI model extracts the content-based features using one or more of: a TextTiling training model, and a language model via self-supervised pre-training.

12. The method of claim 1, wherein the AI model is trained to: extract one or more multimodal features; and generate a prediction of the starting timestamp and the ending timestamp based at least in part on the one or more multimodal features.

13. A communication system comprising one or more processors configured to perform operations of:
connecting to a communication session with a plurality of participants;
receiving, in real time during the communication session, updates to a transcript of a conversation between the participants produced during the communication session, the transcript comprising timestamps for a plurality of utterances associated with speaking participants;
receiving a request from one of the participants to generate a meeting note;
determining, based on the request and the transcript of the conversation, a starting timestamp and an ending timestamp for utterances representing the boundaries of the meeting note, the determining being performed by an artificial intelligence (AI) model employing one or more supervised segmentation techniques and trained via self-supervised pre-training, the determining comprising:
calculating a sequence of scores based on the content-based similarity between a window of sentences in the transcript that precede and follow sentences in the transcript; and
generating predictions of the starting timestamp and the ending timestamp using the plurality of scores in sequential order;
generating, in real time during the communication session, a meeting note where the utterances for the starting timestamp and ending timestamp are the starting utterance and ending utterance of the meeting note, respectively; and
presenting to at least the participant, within a user interface (UI), the generated meeting note.

14. The communication system of claim 13, wherein determining the starting timestamp and the ending timestamp for the meeting note comprises: extracting one or more conversational features via a rule-based model; and determining the starting timestamp and the ending timestamp based at least in part on the conversational features.

15. The communication system of claim 13, wherein determining the starting timestamp and the ending timestamp for the meeting note comprises employing a pairwise meeting note boundary to generate a list of candidates via a rule-based model, each candidate comprising a boundary pair of a starting utterance and an ending utterance representing a boundary for the meeting note.

16. The communication system of claim 15, wherein determining the starting timestamp and the ending timestamp for the meeting note further comprises employing the pairwise meeting note boundary to generate rankings for the boundary pairs via a random forest regressor.

17. The communication system of claim 15, wherein the request from one of the participants to generate a meeting note is initiated by the participant by interactively selecting a UI element for saving a note.

18. The communication system of claim 15, wherein the one or more processors are further configured to perform the operations of: detecting one or more automated note taking conditions, wherein the request from one of the participants to generate a meeting note is automatically initiated based on the detecting of the one or more automated note taking conditions.

19. A non-transitory computer-readable medium containing instructions comprising:
instructions for connecting to a communication session with a plurality of participants;
instructions for receiving, in real time during the communication session, updates to a transcript of a conversation between the participants produced during the communication session, the transcript comprising timestamps for a plurality of utterances associated with speaking participants;
instructions for receiving a request from one of the participants to generate a meeting note;
instructions for determining, based on the request and the transcript of the conversation, a starting timestamp and an ending timestamp for utterances representing the boundaries of the meeting note, the determining being performed by an artificial intelligence (AI) model employing one or more supervised segmentation techniques and trained via self-supervised pre-training, the determining comprising:
calculating a sequence of scores based on the content-based similarity between a window of sentences in the transcript that precede and follow sentences in the transcript; and generating predictions of the starting timestamp and the ending timestamp using the plurality of scores in sequential order;
instructions for generating, in real time during the communication session, a meeting note where the utterances for the starting timestamp and ending timestamp are the starting utterance and ending utterance of the meeting note, respectively; and
instructions for presenting to at least the participant, within a user interface (UI), the generated meeting note.

* * * * *